Figure 7:
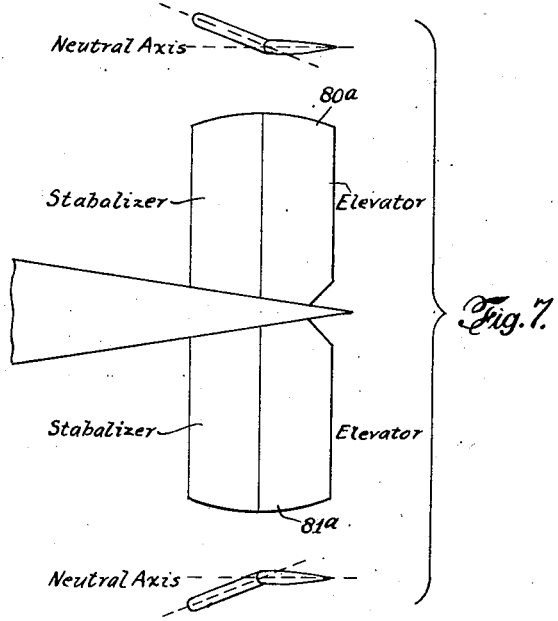

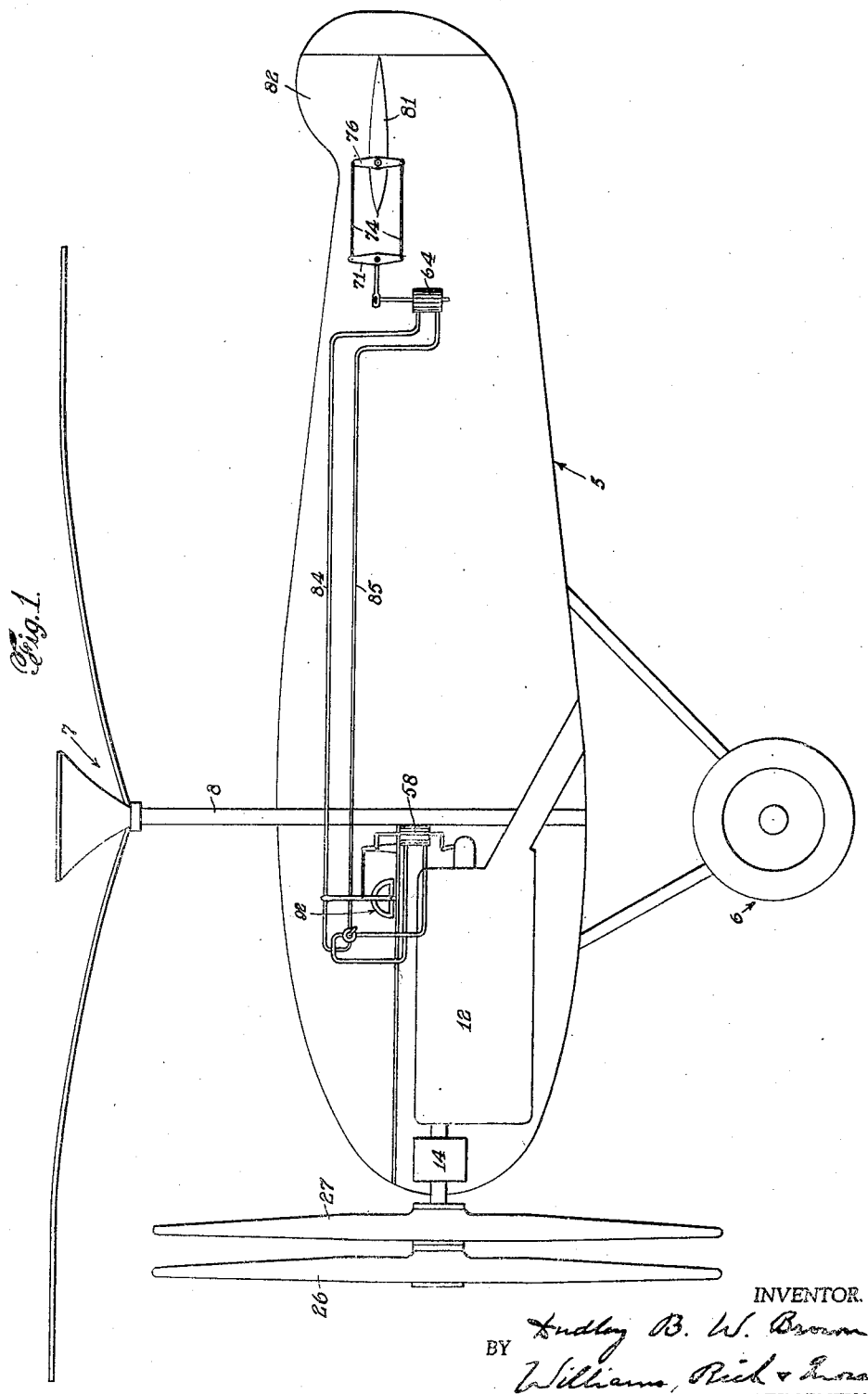

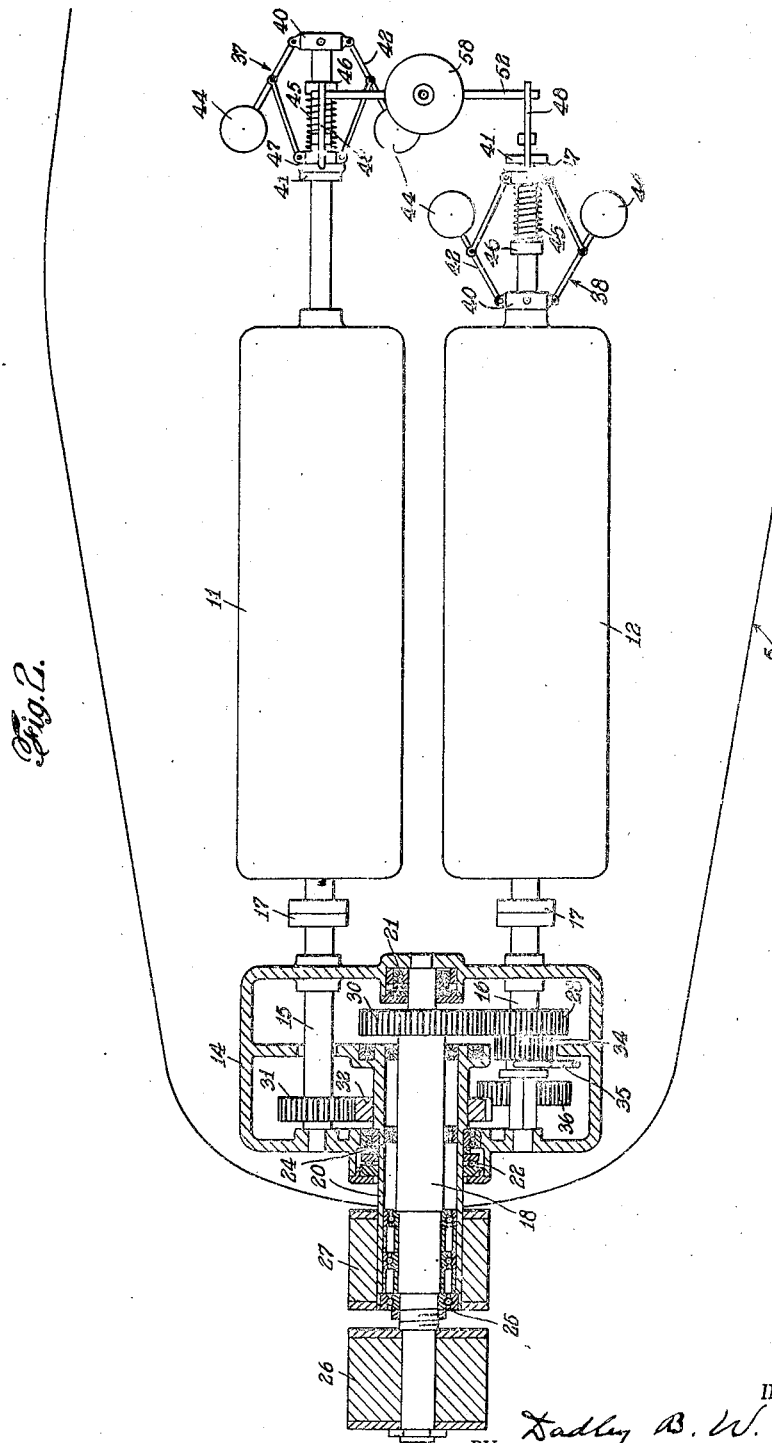

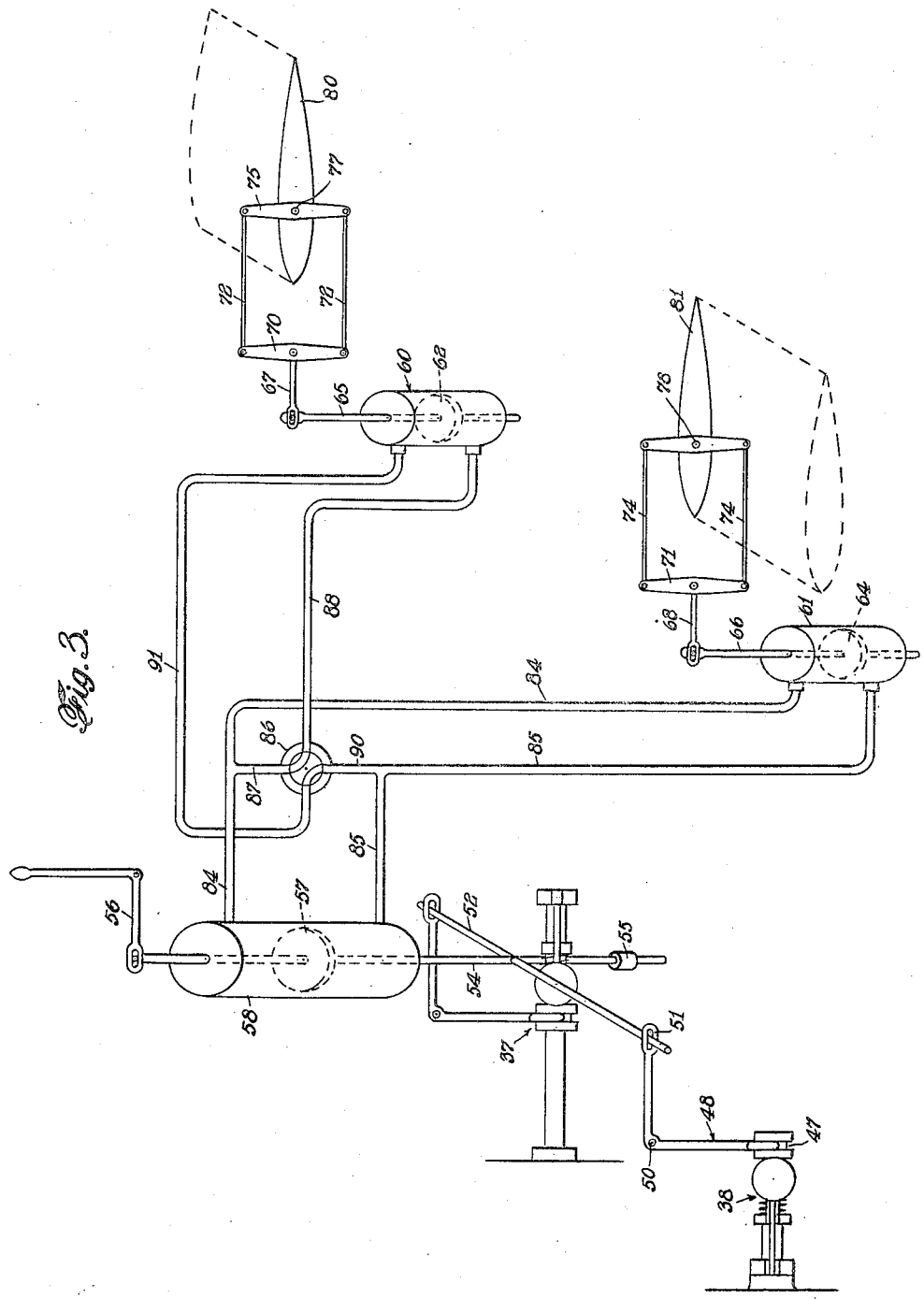

May 11, 1937.     D. B. W. BROWN     2,079,677
AIRPLANE
Filed July 23, 1936     5 Sheets-Sheet 4
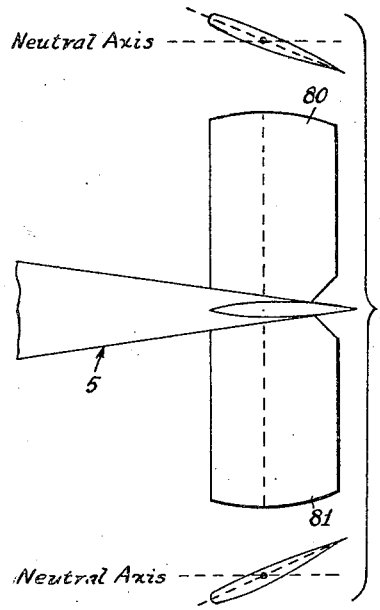
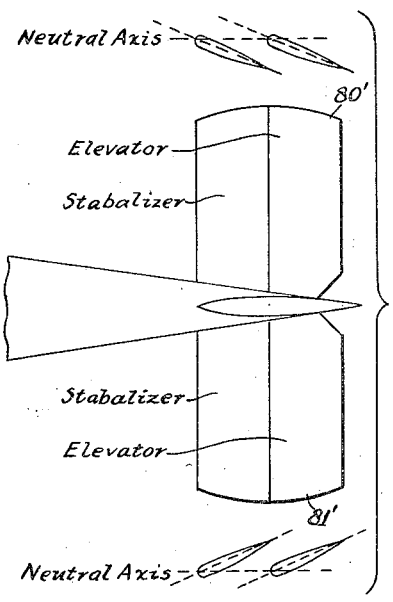
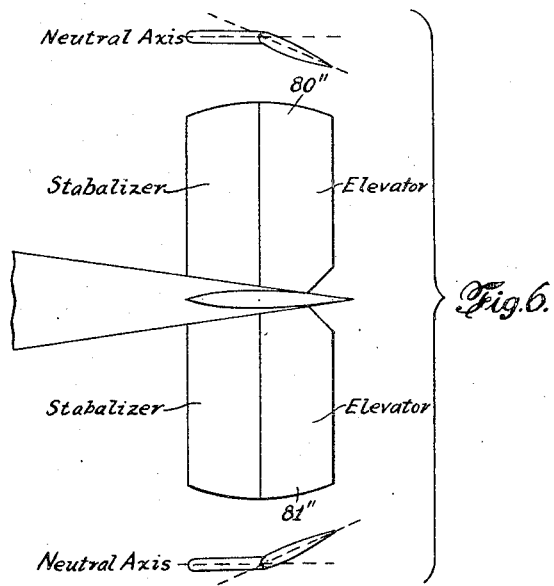
INVENTOR.
Dudley B. W. Brown
BY Williams, Rich & Morse
ATTORNEYS Patented May 11, 1937

2,079,677

UNITED STATES PATENT OFFICE 2,079,677

AIRPLANE

Dudley B. W. Brown, Dobbs Ferry, N. Y.

Application July 23, 1936, Serial No. 92,090

11 Claims. (Cl. 244—75)

This invention relates to aircraft of the heavier-than-air class, of which the fixed and rotary-wing types are examples.

In heavier-than-air aircraft constructed according to present-day practice, the factor of torque, set up by the engine-propeller unit, is inherently such that it produces a rolling moment which, unless counteracted, causes the craft to bank or roll about its longitudinal axis.

In the case of the fixed wing type of aircraft equipped with a moderate size engine, the rolling moment resulting from the torque exerted by the engine-propeller unit is counteracted in flight through the medium of ailerons, or by rigging the wing panels (i. e., arranging one wing at a greater angle of incidence than the other) so that more lift is created on one side of the craft than the other, or by changing the angle of incidence at the tip of the wing with respect to that of the major or remaining portion of the wing, or by the use of trimmers or tabs located on the ailerons. Although such expedients as those just enumerated may be employed with a fair degree of success in counteracting the rolling moment in flight, they are at the same time responsible for the introduction of a yawing moment, thus making it necessary to offset the vertical fin or incorporate a tab or trimmer on the vertical rudder.

On the ground and at the instant of take-off the aerodynamic counterbalancing of torque according to the foregoing principles is not effective.

In order to prevent the plane from turning over on the ground it becomes necessary to rely to a large extent upon the spread of the wheels of the landing gear. It is common practice to space the wheels of a given airplane as far apart as various factors peculiar to its design will permit. The limitations which are imposed on the wheel spread to be employed in connection with a given airplane determines the maximum torque value that may be employed with safety on the ground and therefore limits the size (considered in terms of horsepower output) of the power plant that may be employed. The torque effects are even more objectionable at the instant of take-off when the wheels are no longer in contact with the ground, since the ailerons and wing tips are only moderately effective at the low speeds.

In so far as aircraft of the rotary-wing type are concerned, the torque produced by the engine-propeller unit cannot be satisfactorily counteracted in flight by any of the aerodynamic expedients above mentioned. According to present-day practice, torque counteracting forces are produced in flight through the medium of the rotor by tilting or inclining its axis of rotation, and/or by offsetting the fixed tail surfaces, the angle of inclination of the rotor being fixed in some cases and variable at will by the pilot in other instances.

Utilizing the rotor for the purpose above mentioned has not been found entirely satisfactory as a torque counteracting expedient for many reasons, among which may be mentioned the fact that it results in the introduction of a yawing moment produced by the means employed to counteract the torque, the fact that the amount of tilting required to overcome the torque may be in excess of that required to counteract the yawing moment introduced indirectly by the torque, the fact that the amount of tilting required to overcome the torque may be less than the amount required to counteract the yawing moment introduced indirectly by the torque, thus necessitating the use of the vertical control surface in addition, and the fact that in case of engine failure the tilted rotor will produce an unbalanced rolling moment comparable to that which it was intended to counteract during operation of the motor-propeller unit.

Although the rotary-wing type of aircraft is at present considered a practicable aircraft, it is inherently of such a character that its power plant (considered in terms of horsepower output) must be of a relatively limited power in order that the tilting or inclination of the rotor during flight or the fixed offsetting of the horizontal tail surfaces may exert a sufficient aerodynamic moment to counteract the torque produced by the engine-propeller unit, as will be readily understood when it is taken into account that if the rotor is tilted to a sufficient extent to counterbalance a relatively large torque action (such as would result from a relatively powerful engine-propeller unit) the efficiency of the rotating airfoil system would be impaired. Moreover, the ability of the aircraft to maintain a level flight and a straight course would be impaired. Also the controllability in roll is decreased since the rotor would have to be tilted still further to counteract rolling disturbances.

Aside from the foregoing objections which are peculiar to aircraft of the rotary-wing type, it is to be borne in mind that the above-mentioned expedients which are ordinarily resorted to for the purpose of counterbalancing the torque action in flight are virtually without practical utility on the ground and at the instant of take-off, and since this is true it follows that the power plant (considered in terms of horse-power output) is limited as to power not exceeding that which is consistent with the wheel-spread of the landing gear (as explained in the foregoing discussion of power limitations peculiar to airplanes of the rigid-wing type) even though such value may be even less than would be feasible in flight.

In the rotary-wing type of aircraft it is impractical to use two motors mounted outboard since differences in the speeds of the motors introduce yawing moments about the vertical axis which are resisted by the inertia of the fuselage only, whereas in fixed wing aircraft such yawing moments are resisted by the inertia and aerodynamic effects of the entire wing structure.

Important objects of the present invention are to overcome the foregoing objections peculiar to aircraft of both fixed and rotary-wing types constructed according to present-day practice, and to that end I contemplate the use of a plurality of propellers which are adapted to so function as to preclude the introduction of any effective torque action, except when operated at appreciably different speeds, in association with control means whereby varying rolling moments, in either direction about the horizontal axis, resulting from differences in the speeds of the motors may be compensated by the introduction of equal and opposing aerodynamic torque.

Although the present control means for overcoming the torque produced by one or more engines have been devised particularly for use with two tandem propellers carried by concentric shafts rotating in opposite directions and are adapted to be brought into operation when one engine either no longer functions or is operating at an appreciably lower speed than the other, it will be understood that they are not restricted to such a propeller arrangement and that they may be employed on any type aircraft where torque produced by an engine, or engines, tends to roll the craft.

According to the present invention, introduction of aerodynamic torque to counteract engine torque may be accomplished either by:

1. Differentially operated horizontal tail surfaces adapted to produce aerodynamic torque in the direction desired by depressing the elevator and stabilizer, built as a unit, on the side on which greater lift is desired and raising the elevator and stabilizer on the other side for decreasing the lift, or by 2. Differentially operated horizontal tail surfaces adapted to produce aerodynamic torque in the direction desired by depressing the trailing edges of the elevator and the stabilizer, built as separate units, on the side on which greater lift is desired and raising the elevator and stabilizer on the other side for decreasing the lift, or by 3. Differentially operated horizontal tail surfaces adapted to produce aerodynamic torque in the direction desired by depressing the elevator (without reference to the position of the stabilizer) on the side on which greater lift is desired and raising the elevator on the other side for decreasing the lift, or by 4. Differentially operated horizontal tail surfaces adapted to produce aerodynamic torque in the direction desired by raising the leading edge of the stabilizer (without reference to the position of the elevator) on the side on which greater lift is desired and depressing the leading edge of the stabilizer on the other side for decreasing the lift, or by 5. Differentially operated horizontal tail surfaces adapted to produce aerodynamic torque in the direction desired by raising the leading edge of the stabilizer and depressing the elevator on the side on which greater lift is desired and depressing the leading edge of the stabilizer and raising the elevator on the other side for decreasing the lift.

Another object of the invention is to provide means whereby the control system, regardless of whichever one of the above enumerated means may be employed, may be readily so conditioned by the pilot as to enable the horizontal tail surfaces to be employed as a normal elevator for pure longitudinal control, and to that end I contemplate the provision of suitable instrumentalities through the medium of which the horizontal tail surfaces may be, in effect, so interlocked at will by the pilot that they will respond in the manner of normal elevators to the various control operations to which they may be subjected.

Other objects and advantages of the invention will become apparent from the following description when taken in connection with the accompanying drawings, in which—

Fig. 1 is a view partly in elevation showing the application of the invention to an aircraft of the rotary-wing type; Fig. 2 is an enlarged view showing partly in section and partly in plan a system of gearing by which a pair of propellers are connected to individual power plants and also showing such power plants in association with a pair of speed-responsive devices which constitute elements of the torque-compensating means appearing generally in Fig. 1; Fig. 3 is a schematic view illustrating in its entirety the torque-compensating means appearing generally in Fig. 1 and partially in Fig. 2; Fig. 4 is a diagrammatic view showing more in detail the type of differentially controlled horizontal tail surfaces appearing in Figs. 1 and 3; and Figs. 5, 6, 7 and 8 are diagrammatic views showing other types of differentially controlled horizontal tail surfaces which may be employed in lieu of the type shown in Figs. 1, 3 and 4 to produce aerodynamic torque in counteracting engine torque.

Referring to the drawings, the numeral 5 indicates generally an aircraft of the rotary-wing type equipped with a landing gear 6 and a rotor 7, the latter of which is mounted in the usual manner on the upper end of a pylon 8.

Within the fuselage, there are suitably mounted a pair of internal combustion engines 11 and 12, which in the present instance are illustrated as being of the inverted in-line type and arranged in a parallel relation. Forwardly of the engines 11 and 12, there is suitably mounted a gear case 14 within which are suitably journaled a pair of drive shafts 15 and 16, coupled, as at 17, to the respective engine shafts. Disposed intermediate the shafts 15 and 16, are a pair of concentric shafts 18 and 20, collectively supported as a unit in suitable bearings 21, 22, 24 and 25 which are such that the shafts are held on a common axis and are maintained against longitudinal displacement. The forward ends of the shafts 18 and 20 are equipped with suitable propellers 26 and 27, respectively, which are rotated in opposite directions by a pair of gear trains, one of which includes a gear 28 secured to the engine shaft 16 and meshing with a gear 30 secured to the shaft 18, and the other of which includes a gear 31 secured to the engine shaft 15 and meshing with a gear 32 secured to the propeller shaft 20. If desired a power take-off, to be utilized for rotor starting, road drive or as otherwise desired, may be employed, such take-off being herein illustrated as including a gear 34 slidably splined to the engine shaft 16 and adapted to be moved at will through the instrumentality of a suitable gear shift mechanism (not shown except for its included yoke-type of shifting arm 35) into engagement with a gear 36 carried by a take-off shaft which is not shown but which may be journaled within the gear case 14.

From the foregoing, reference being had particularly to the power transmission means employed for so connecting the engines 11 and 12 to the respective propellers 26 and 27 as to cause them to rotate about a common axis in opposite directions, it will be understood that so long as the engines are operating at the same speed (in which case the propellers will be operated at the same R. P. M.) the engine-propeller units 11—27 and 12—26, respectively, will exert a torque-balancing effect on each other. However, in the event the speed of one engine exceeds the speed of the other engine to such an extent that there are differences in the torque, there will be a resultant torque in one direction or the other depending, of course, upon whether the engine 11 is operating at a greater or at a lesser speed than the engine 12; but, regardless of the direction in which such resultant torque is directed, its value will be in accordance with the engine speed differential.

In order that the above-mentioned speed differential may be utilized to compensate the resultant torque which is set up by reason of such speed differential, torque-compensating means are provided which are adapted to respond to appreciable speed differentials in such a manner as to automatically exert such a controlling influence on the aircraft through suitable movement of the differentially controlled tail surfaces, hereinafter more particularly described, to overcome its tendency to roll.

The above-mentioned torque-compensating means, which is schematically illustrated in its entirety in Fig. 3, includes a pair of speed-responsive devices 37 and 38 which are operated in synchronism with the engines 11 and 12 and for convenience are illustrated as associated with the shafts thereof, as shown most clearly in Fig. 2. Each of the speed-responsive devices 37 and 38 is of the centrifugal type and includes a pair of collars 40 and 41 which are, respectively, fixed to and slidable on the engine shaft. These collars are connected together by a suitable system of links 42, with which are associated a pair of weights 44, the relation of the links and weights being such that as the weights are moved outwardly under the action of centrifugal force the collar 41 will be moved toward the collar 40 against the influence of a compression spring 45, one end of which engages the slidable collar 41 and the other of which engages an abutment 46 carried by the engine shaft and adapted to assume various positions of adjustment thereon whereby the force of compression exerted by the spring may be predetermined as desired. The collar 41 of each of the speed-responsive devices 37—38 is provided with a circumferential groove 47 adapted to receive the bifurcated end of a bell-crank lever 48, which is pivotally supported as at 50 and one arm of which is provided with a slot-like opening 51. The slot-like openings 51 of the bell-crank levers 48 are adapted to receive opposite ends of an actuating rod 52, which is rigidly connected to a piston rod 54, the lower end of which may operate within a suitable guide 55 and the upper end of which is pivotally and slidably connected to a bell-crank type of control lever 56 located within convenient reach of the pilot. To the piston rod 54 there is connected a piston 57 disposed within a cylinder 58, hereinafter referred to as the master cylinder, the end chambers of which at opposite sides of the piston constitute portions of a closed hydraulic system, as will herinafter more clearly appear, and are adapted to communicate with a pair of control cylinders 60 and 61 by way of a selector valve and various pipes or conduits hereinafter more particularly described. The control cylinders 60 and 61 are preferably located in the vicinity of the tail structure of the aircraft and are equipped with pistons 62 and 64, respectively, to which are connected piston rods 65 and 66, pivotally and slidably connected to a pair of levers 67 and 68 which are secured to a pair of pivotally supported rocker arms 70 and 71. These rocker arms are connected at their outer ends by links 72 and 74 to the outer ends of a pair of similar rocker arms 75 and 76, which are secured to a pair of horizontally disposed actuating shafts 77 and 78, suitably mounted in and forming a part of the aircraft tail structure and rigidly connected to a pair of horizontal tail surfaces 80 and 81, disposed at opposite sides of the vertical fin 82.

In order that the horizontal tail surfaces 80 and 81 may respond to movements of the piston 57 of the master cylinder 58, such cylinder is connected at its opposite ends to a pair of pipes 84 and 85, the former of which is at all times maintained in communication with the upper end, as viewed in Fig. 3, of the control cylinder 61, and the latter of which is at all times maintained in communication with the lower end of that control cylinder. Through the medium of a control valve 86 and its associated branch pipes 87—88 and 90—91, the pipes 84 and 85 may be maintained, respectively, in communication with the lower and upper ends of the control cylinder 60, as viewed in Fig. 3.

Before proceeding with the description of the operation of the control system generally, it may be well to mention that inasmuch as the collars 41 of the speed-responsive devices 37 and 38 are, in effect, connected together by way of the bell-crank levers 48 and the operating rod 52 the forces exerted on such collars under the influence of centrifugal action peculiar to the speed-responsive devices are in opposition to each other, as is also true with regard to the forces exerted on the collars by the springs 45. It is therefore evident that under normal conditions, as when the propellers 26 and 27 are stationary or are operating at substantially the same speeds, the pistons 57, 62 and 64 will be maintained in a state of equilibrium, substantially as shown in Fig. 3, as a consequence of which the horizontal tail surfaces 80 and 81 will be maintained in neutral positions. As soon, however, as the speed of one engine appreciably exceeds that of the other engine the centrifugal force exerted by the speed-responsive device which is associated with the faster operating engine will overbalance the force exerted by the other speed-responsive device, as a consequence of which a resultant movement, corresponding to any substantial speed differential, is transmitted to the piston rod 54. To illustrate, should the speed of the engine 11 appreciably exceed that of the engine 12, the centrifugal action exerted by the weights 44 of the speed-responsive device 37 will overbalance the opposing centrifugal action peculiar to the speed-responsive device 38, thus causing an upward movement of the piston 57; whereas if the speed of the engine 12 exceeds that of the engine 11, the centrifugal action exerted by the weights 44 of the speed-responsive device 38 will overbalance that of the weights 44 of the speed-responsive device 37, with the result that the piston 57 will be moved downwardly.

From the foregoing description of the operation of the speed-responsive devices 37 and 38 it will become obvious that as the piston 57 is moved upwardly in response to an appreciable speed differential in favor of the engine 11, the horizontal tail surface 80 will be so moved as to exert a positive lift and the horizontal tail surface 81 will be so moved as to exert a negative lift, whereas if the piston 57 is moved downwardly in response to an appreciable speed differential in favor of the engine 12, the horizontal tail surface 80 will be so moved as to exert a negative lift and the horizontal tail surface 81 will be so moved as to exert a positive left. Needless to say that as the speed differential vanishes, as when the engines are approaching identical speeds, the pistons 57, 62 and 64 approach a state of equilibrium and the horizontal tail surfaces 80 and 81 approach their respective neutral positions, a state of complete equilibrium being reached (reference being had to the pistons 57, 62 and 64) and positions of absolute neutrality (reference being had to the elevating fins 80 and 81) being assumed the instant the speed of rotation of the engines 11 and 12 becomes identical.

It is to be especially observed that regardless of whether the engines are operating at identical speeds or at substantially different speeds, the horizontal tail surfaces 80 and 81 may be differentially actuated at will by the pilot by moving the operating lever 56 in one direction or the other.

From the foregoing, it will be appreciated that the manually operated control lever 56 may be employed, as when the valve 86 is positioned as shown to produce an intentional rolling moment, if the pilot desires, to effect an intentional bank of the plane in either direction regardless of the speeds of the respective engines.

Inasmuch as the valve 86 may be so moved as to establish communication between its associated branch pipes 87—91 and 88—90, such valve may be resorted to as means for so conditioning the system as to enable it to be employed purely as a manual control for the horizontal tail surfaces 80 and 81 which are then adapted to function in the manner of an ordinary elevator, as will be readily understood when it is taken into account that under such conditions upward displacement of the piston 57 will cause the pistons 62 and 64 to move downwardly simultaneously, whereas downward displacement of the piston 57 will cause the pistons 62 and 64 to move upwardly simultaneously. Since the horizontal tail surfaces 80 and 81 may be operated in the manner of a conventional elevator system they may be utilized to advantage with aircraft of the rotary-wing type which are ordinarily such that the only means of vertical control is afforded by tilting the rotor as well as to advantage as an auxiliary stabilizer to counteract maldistribution of weight about the center of gravity—all without impairing the aerodynamic efficiency of the rotor and without introducing undue rotor drag.

Although it is believed that the relation of the horizontal tail surfaces 80 and 81 (the latter of which is illustrated in Fig. 1 and both of which are schematically shown in Fig. 3) to each other will be readily appreciated from that part of the foregoing description wherein the function and the operation of these tail surfaces are particularly described, it may be well to point out that their structural relationship to each other and to the fuselage of the aircraft 5 may be better understood from an inspection of Fig. 4. Here it will be observed that each of the horizontal tail surfaces 80 and 81 includes an elevator and a stabilizer (built as a unit according to the suggestion contained in paragraph No. 1, above), the elevator being regarded as that portion of the tail surface at the rear of its axis of rotation and the stabilizer being regarded as that portion of the tail surface at the front of its axis of rotation.

Referring to Figs. 5, 6, 7 and 8, it will be observed that—

In Fig. 5 the tail surfaces 80' and 81' each includes an elevator and a stabilizer, which are so labeled and are rotatable as separate units about their respective axes as suggested in paragraph No. 2, above.

In Figs. 6 it will be noted that each of the horizontal tail surfaces 80'' and 81'' also includes an elevator and a stabilizer which are so related to each other that the elevator may be either depressed or raised about its axis of rotation without disturbing the position of its associated stabilizer as suggested in paragraph No. 3, above.

In Fig. 7 the horizontal tail surfaces 80ª and 81ª are quite similar to those of Fig. 6, but here it will be observed that the leading edges of the stabilizers may be either raised or lowered (as suggested in paragraph No. 4, above) about their axes of rotation without disturbing the positions of their associated elevators.

Figure 8:
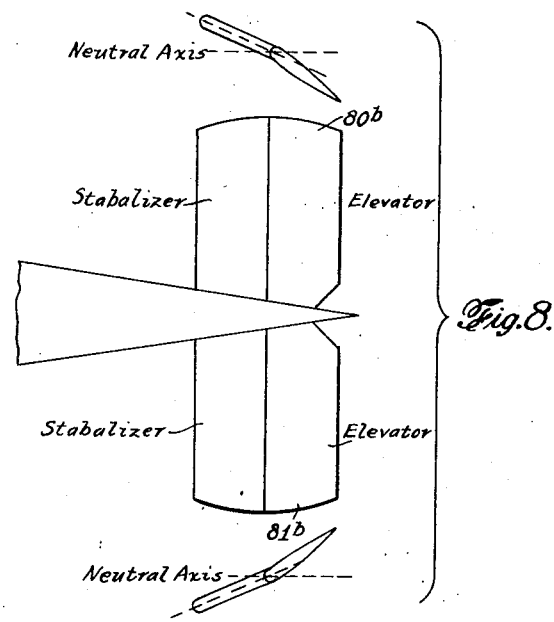

In Fig. 8 it will be observed that the horizontal tail surfaces 80ᵇ and 81ᵇ are each such that their included stabilizer and elevator are collectively movable as a unit and are individually rotatable differentially so as to enable the leading edge of the stabilizer to be either raised while its associated elevator is being depressed or to be depressed while its associated elevator is being raised as suggested in paragraph No. 5, above.

It will be understood that various other modifications may be resorted to without departing from the spirit of the invention or the scope of the following claims, as for example, the motors may be of various designs, they may be placed in various positions with relation to each other, various forms of power transmission means connecting the engines to the respective propellers may be substituted for the particular gearing illustrated, and other types of speed-responsive devices may be employed in lieu of the particular units herein shown and described.

What is claimed is:

1. In a motor-propeller driven aircraft, means for producing an intentional rolling moment and for counterbalancing motor-propeller torque comprising differentially operable horizontal tail surfaces, and control means manually operable, on the one hand, for effecting differential movement of said tail surfaces, and responsive, on the other hand, to motor-propeller torque for automatically effecting differential movement of said tail surfaces.

2. In a motor-propeller driven aircraft, horizontal tail surfaces, control means for effecting movement of said tail surfaces in unison whereby such surfaces serve as an elevator, and conditioning means for rendering said control means operable to effect only differential movement of said tail surfaces whereby such surfaces may serve to counterbalance motor-propeller torque or to produce an intentional rolling moment.

3. In a motor-propeller driven aircraft, horizontal tail surfaces, control means for effecting movement of said tail surfaces in unison whereby such surfaces serve as an elevator, and means for rendering said control means operable to effect differential movement of said tail surfaces whereby such surfaces may serve to counterbalance motor-propeller torque or to produce an intentional rolling moment, said control operating means being manually operable to effect movement of said tail surfaces in unison, automatically responsive to motor-propeller torque to effect differential movement of said surfaces in counterbalancing motor-propeller torque and manually operable to effect differential movement of said surfaces to produce an intentional rolling moment.

4. In an aircraft, a plurality of motor-propeller driving units so related that the torque peculiar to one unit is in opposition to the torque peculiar to another unit, means for counterbalancing resultant motor-propeller torque comprising differentially operable horizontal tail surfaces, and control means responsive to resultant motor-propeller torque for automatically effecting differential movement of said tail surfaces.

5. In an aircraft, a plurality of motor-propeller driving units so related that the torque peculiar to one unit is in opposition to the torque peculiar to another unit, means for producing an intentional rolling moment and for counterbalancing resultant motor-propeller torque, comprising differenitally operable horizontal tail surfaces, and control means manually operable, on the one hand, for effecting differential movement of said tail surfaces, and responsive, on the other hand, to resultant motor-propeller torque for automatically effecting differential movement of said tail surfaces.

6. In an aircraft, a plurality of motor-propeller driving units so related that the torque peculiar to one unit is in opposition to the torque peculiar to another unit, horizontal tail surfaces, control means for effecting movement of said tail surfaces in unison whereby such surfaces serve as an elevator, and means for rendering said control means operable to effect differential movement of said tail surfaces whereby such surfaces may serve to counterbalance resultant motor-propeller torque or to produce an intentional rolling moment, said control means being manually operable when employed to effect movement of said tail surfaces in unison, automatically responsive to resultant motor-propeller torque to effect differential movement of said surfaces in counterbalancing motor-propeller torque and manually operable to effect differential movement of said surfaces to produce an intentional rolling moment.

7. In a motor-propeller driven aircraft, horizontal tail surfaces adapted to be differentially operated to either counterbalance motor-propeller torque or to produce an intentional rolling moment, and speed-responsive control means operating under the influence of motor-propeller torque to effect differential movement of said surfaces in counterbalancing motor-propeller torque and manually operable to effect differential movement of said surfaces to produce an intentional rolling moment.

8. In a motor-propeller driven aircraft, means for producing an intentional rolling moment and for counterbalancing motor-propeller torque comprising differentially operable horizontal control surfaces, and control means manually operable, on the one hand, for effecting differential movement of said control surfaces, and responsive, on the other hand, to motor-propeller torque for automatically effecting differential movement of said control surfaces.

9. In an aircraft, a plurality of motor-propeller driving units so related that the torque peculiar to one unit is in opposition to the torque peculiar to another unit, means for counterbalancing resultant motor-propeller torque comprising differentially operable horizontal control surfaces, and control means responsive to resultant motor-propeller torque for automatically effecting differential movement of said control surfaces.

10. In an aircraft, a plurality of motor-propeller driving units so related that the torque peculiar to one unit is in opposition to the torque peculiar to another unit, means for producing an intentional rolling moment and for counterbalancing resultant motor-propeller torque, comprising differentially operable horizontal control surfaces, and control means manually operable, on the one hand, for effecting differential movement of said control surfaces, and responsive, on the other hand, to resultant motor-propeller torque for automatically effecting differential movement of said control surfaces.

11. In a motor-propeller driven aircraft, horizontal control surfaces adapted to be differentially operated to either counterbalance motor-propeller torque or to produce an intentional rolling moment, and speed-responsive control means operating under the influence of motor-propeller torque to effect differential movement of said surfaces in counterbalancing motor-propeller torque and manually operable to effect differential movement of said surfaces to produce an intentional rolling moment.

DUDLEY B. W. BROWN.